(12) United States Patent
Golioto

(10) Patent No.: US 9,231,401 B2
(45) Date of Patent: *Jan. 5, 2016

(54) WIRELESS COMMUNICATION BASE STATION WITH CURRENT LIMITING CAPABILITY

(71) Applicant: 8631654 CANADA INC., Ottawa (CA)

(72) Inventor: Igor Golioto, Fairfield, NJ (US)

(73) Assignee: 8631654 CANADA INC., Ottawa, Ontario (CA)

( * ) Notice: Subject to any disclaimer, the term of this patent is extended or adjusted under 35 U.S.C. 154(b) by 29 days.

This patent is subject to a terminal disclaimer.

(21) Appl. No.: 14/229,071

(22) Filed: Mar. 28, 2014

(65) Prior Publication Data

US 2014/0211354 A1    Jul. 31, 2014

Related U.S. Application Data

(63) Continuation of application No. 11/234,900, filed on Sep. 26, 2005, now Pat. No. 8,700,093.

(51) Int. Cl.
| | | |
|---|---|---|
| H04M 1/00 | (2006.01) |
| H04B 1/38 | (2015.01) |
| H02H 7/122 | (2006.01) |
| H03G 3/00 | (2006.01) |
| H03G 3/20 | (2006.01) |
| H02H 9/02 | (2006.01) |
| H04B 15/00 | (2006.01) |

(52) U.S. Cl.
CPC ............... *H02H 9/025* (2013.01); *H04B 15/00* (2013.01); *H04B 2215/069* (2013.01)

(58) Field of Classification Search
CPC .......... H04B 1/40; H04B 15/00; H02H 9/025; H02H 9/02; H03F 1/0211
See application file for complete search history.

(56) References Cited

U.S. PATENT DOCUMENTS 8,700,093 B2 *    4/2014    Golioto .................... 455/561

* cited by examiner

*Primary Examiner* — Andrew Wendell
(74) *Attorney, Agent, or Firm* — Volpe and Koenig, P.C.

(57) ABSTRACT

A wireless communication system base station (20) includes a base station transceiver (26) that has at least one operative component (32) for facilitating wireless communications. A current limiting device (36) includes at least one field effect transistor for selectively controlling current flow to a capacitive stability device (34) associated with at least one of the operative components (32). In the disclosed example, the current limiting device (36) is in series with the capacitive stability device (34) but in parallel with the operative component (32).

19 Claims, 2 Drawing Sheets

WIRELESS COMMUNICATION BASE STATION WITH CURRENT LIMITING CAPABILITY

CROSS REFERENCE TO RELATED APPLICATION(S)

This application is a continuation of U.S. patent application Ser. No. 11/234,900, filed Sep. 26, 2005, which is incorporated by reference as if fully set forth.

FIELD OF INVENTION

This invention generally relates to communication. More particularly, this invention relates to wireless communication systems.

BACKGROUND

Wireless communication systems typically include base stations that are arranged to provide wireless communication service over a selected geographic region, for example. Base stations typically include an antenna and a base station transceiver (BTS). The operative components of the BTS typically include a DC-DC converter. A stability capacitor typically is placed in parallel with at least the DC-DC converter to provide stability in a known manner.

Introducing a stability capacitor provides the advantage of more reliable operation, however, there is a drawback. During start-up conditions, for example, the stability capacitor will cause an undesirably high current draw until the capacitor is fully charged, for example. In some instances, the current rush can be 200 times greater than the steady state current of the operative components of the BTS. Such a high current draw may damage some components and, at least, typically triggers a battery or other powering device shutdown.

To address that situation, the typical approach is to include a current limiting field effect transistor (FET) that throttles the current to the operative components during start up conditions. While this approach has proven useful, those skilled in the art are always striving to make improvements. For example, the arrangement of the FET in series with the capacitive stability device and the operative components requires the FET to be designed to accommodate the steady state current of the operative components during normal operation. This introduces additional cost into a BTS. Another issue presented by commonly used current limiting FETs is that they require heat sink capability to absorb heat generated during operation. Adding additional heat sink components adds further cost to a BTS.

It would be useful to have a new arrangement that does not have the added costs associated with typical current limiting FETs while still providing the current protection capability of known arrangements.

SUMMARY

An exemplary embodiment of a base station for use in a wireless communication system includes a power supply. At least one operative component that is powered by the power supply facilities wireless communications. A capacitive stability device is in parallel with the at least one operative component. A current limiting device is in series with the capacitive stability device between the power supply and the capacitive stability device. The current limiting device is in parallel with the at least one operative component.

Such an arrangement provides current limiting capabilities without requiring the current for powering the at least one operative component during normal operation to flow through the current limiting device. One advantage to this example is that the current limiting device can be sized to handle the in rush current to the capacitive stability device and then to handle a steady state current flowing toward that device, which is significantly lower than the steady state current flowing to the at least one operative component. This introduces substantial cost savings in a base station.

An exemplary method of controlling power to at least one operative component within a base station that is useful for facilitating wireless communications includes selectively throttling current to a capacitive stability device that is in parallel with the operative component without throttling the current to the operative component.

The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
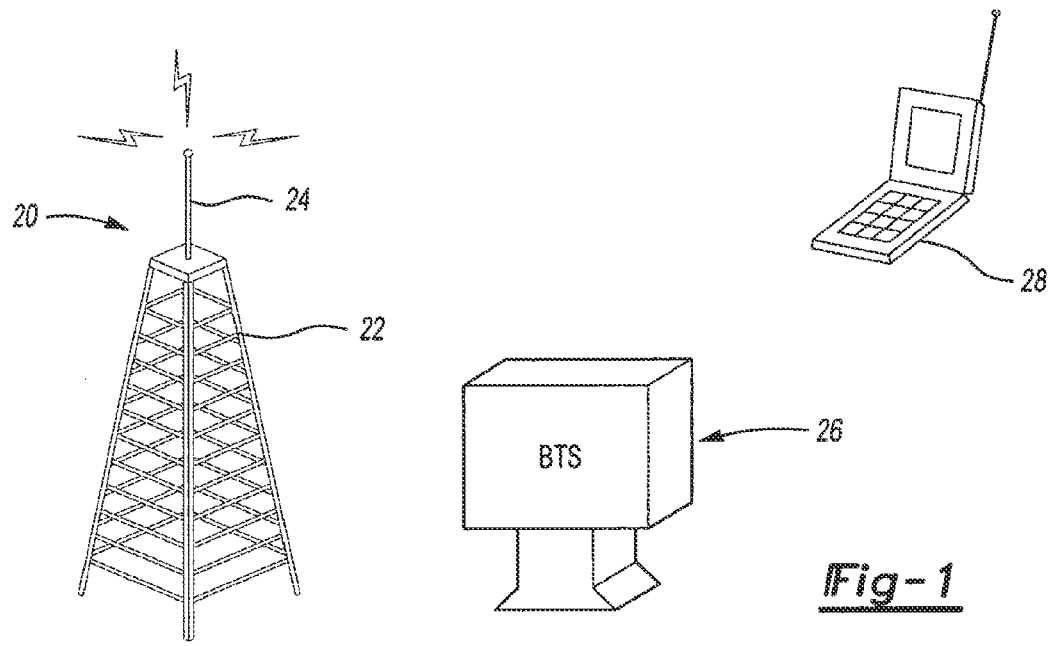
FIG. 1 schematically illustrates selected portions of a wireless communication system including a base station designed according to an embodiment of this invention.

FIG. 1 schematically shows selected portions of a wireless communication system including a base station 20. A radio tower 22 supports an antenna 24 in a known manner. A base station transceiver (BTS) 26 is used in a known manner for facilitating communications between the base station 20 and at least one mobile station 28.

The BTS 26 includes operative components that facilitate wireless communications in a known manner. One such component is a DC-DC converter that operates in a known manner. It is desirable to include a capacitive stability device in parallel with the DC-DC converter. The illustrated example includes such an arrangement.

Figure 2:
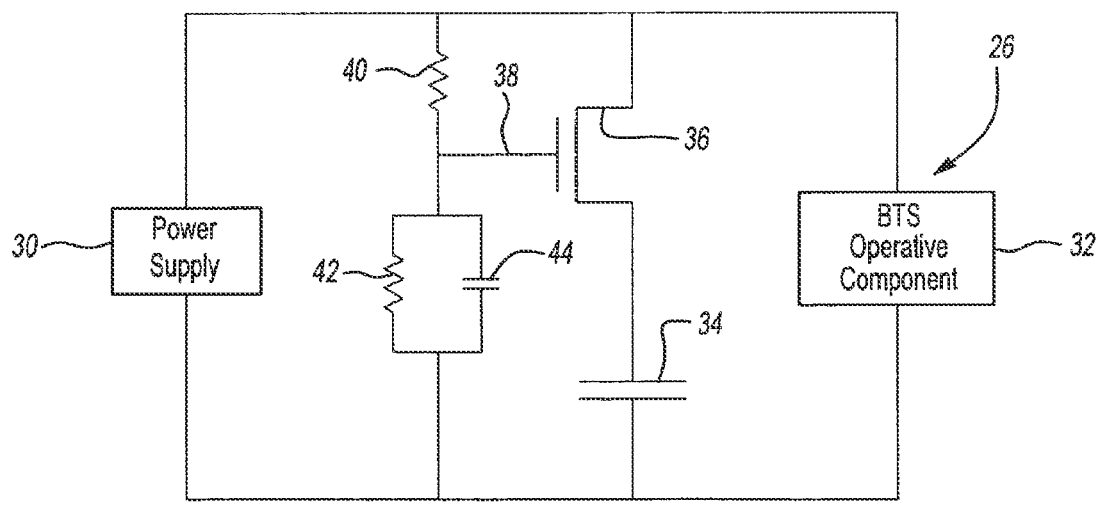
FIG. 2 schematically illustrates an example arrangement designed according to an embodiment of this invention.

Referring to FIG. 2, selected portions of the BTS 26 are schematically shown. A power supply 30 provides power for the operative components 32 to operate as needed to facilitate wireless communications. A capacitive stability device 34 is in parallel with the operative components 32. In the illustrated example, the capacitive stability device 34 comprises a capacitor. The capacitor of the capacitive stability device 34 is sized to meet the needs of a particular situation. Those skilled in the art who have the benefit of this description will be able to select appropriate components to meet their particular needs.

The illustrated example includes a current limiting device 36 in series with the capacitive stability device 34 to protect against current overload conditions such as during start up, for example. In the illustrated example, the current limiting device 36 comprises a field effect transistor (FET). The current limiting device 36 is in series with the capacitive stability device 34 and in parallel with the operative components 32.

This is different than traditional arrangements where the current limiting device was placed in series with the operative components 32.

The FET of the current limiting device 36 operates in a generally known matter to throttle initial charging current going to the capacitive stability device 34 but presenting very low resistance (e.g., the FET is open wide) during steady state operation.

The illustrated example includes a gate 38 of the FET coupled with a resistor 40 and a parallel combination of a resistor 42 and a capacitor 44. The resistor 40, for example, raises the gate voltage of the FET in a known manner.

Having the current limiting device 36 only in series with the capacitive stability device 34 and in parallel with the operative components 32 provides significant advantages.

For example, the FET may be sized for handling the steady state current flowing to the capacitive stability device 34 rather than the steady state current flowing to the operative components 32. In one example, the operative components draw a steady state current on the order of 100 amps. Some examples include a 90 amp steady state current to the operative components 32. During steady state operation, the capacitive stability device 34 receives ripple current of a significantly lower magnitude. Some examples include a 5 amp current during steady state operation flowing to the capacitive stability device 34. As known, such ripple currents are associated with switching in a DC-DC converter. The FET of the current limiting device 36 can therefore be sized to accommodate a steady state current of approximately 5 amps rather than one of approximately 100 amps. This allows for cost savings compared to prior arrangements.

Figure 3:
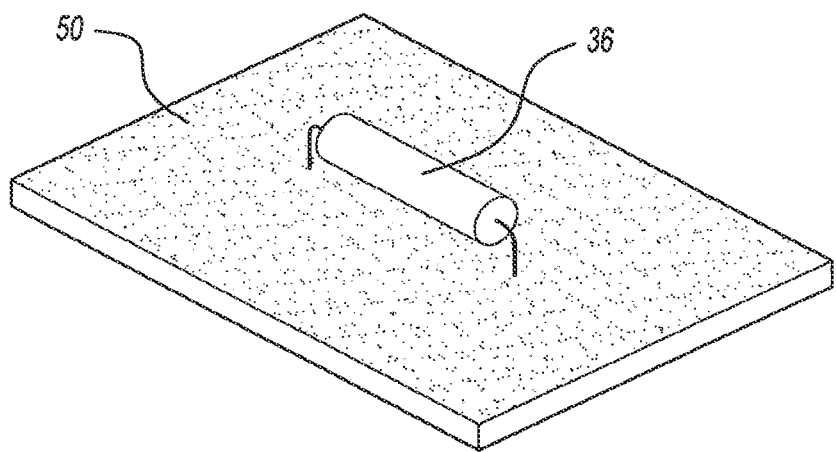
FIG. 3 schematically illustrates a selected component of the embodiment of FIG. 2.

Because the FET of the current limiting device 36 can be sized to accommodate significantly smaller steady state current compared to previous arrangements, the heat sink capacity in the BTS for accommodating the FET can be more advantageously and economically realized. The smaller sized FET can be mounted on a circuit board substrate typically used for printed circuit boards. FIG. 3 schematically illustrates such a circuit board 50 on which the FET of the current limiting device 36 is supported. The circuit board 50 provides the primary heat sink capacity for absorbing heat associated with operation of the current limiting device 36.

Figure 4:
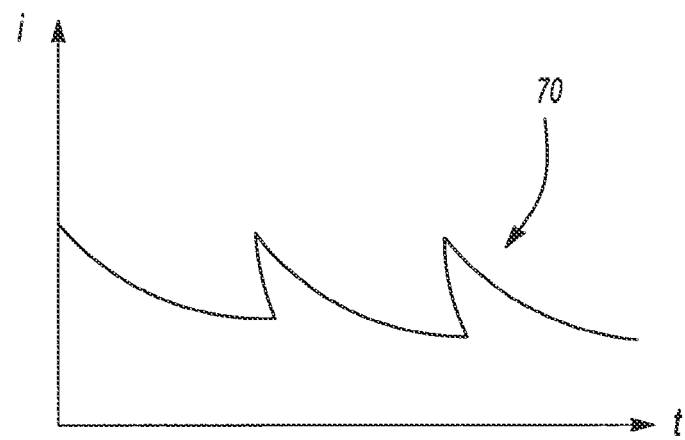
FIG. 4 is a graphical illustration showing an example current control strategy in one embodiment.

Some examples include a plurality of capacitors within the capacitive stability device 34. One example includes arranging such capacitors in parallel and configuring the current limiting device and the time constants to sequentially bring each capacitor on line during start up to control the in rush current in a generally sequential manner. One example includes bringing a first capacitor on line and allowing it to be nearly completely charged before bringing the next capacitor on line. This results in a lower magnitude for the in rush current over the start up charging time for all of the capacitors combined. One example results in a generally saw tooth profile of the charging current over time as shown in the plot 70 of FIG. 4. One example includes FETs in parallel with each other and in series with respective capacitors. Such a strategy allows for using smaller capacity FETs in a current limiting device 36 to realize the advantages of the disclosed example even in situations where there is a relatively large bulk capacitance associated with the capacitive stability device 34.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A device for limiting a current through an operative component powered by a power supply, comprising:
   a capacitive stability device coupled in parallel with the at least one operative component; and
   a current limiting device coupled in series with the capacitive stability device between the power supply and the capacitive stability device, and coupled in parallel with the operative component;
   wherein the current limiting device is configured to operate in an initial state to restrain a charging current to the capacitive stability device, and further configured to operate in a steady state to allow the charging current to flow to the capacitive stability device.

2. The device of claim 1, wherein the current limiting device comprises a field effect transistor (FET) connected in series with the capacitive stability device.

3. The device of claim 2, wherein the current limiting device further comprises a set of components connected across the operative component and to a gate terminal of the FET, for providing a biasing current for the FET.

4. The device of claim 3, wherein the set of components includes a first resistor connected between a first terminal of the power supply and a gate terminal of the FET, for raising a gate voltage of the FET.

5. The device of claim 3, wherein the set of components includes a parallel combination of a second resistor and a capacitor connected between the gate terminal of the FET and a second terminal of the power supply.

6. The device of claim 1, wherein the capacitive stability device comprises a capacitor.

7. The device of claim 1, wherein the capacitive stability device comprises a plurality of capacitors.

8. The device of claim 7, wherein the current limiting device controls power supply to the capacitors in a sequential manner.

9. The device of claim 7, wherein the current limiting device comprises a plurality of FETs in parallel with each other and in series with a respective capacitor of the plurality of capacitors.

10. The device of claim 1, further comprising a circuit board substrate supporting the current limiting device.

11. The device of claim 10, wherein the circuit board substrate is a primary heat sink for the current limiting device.

12. A method of controlling power supply to an operative component, comprising:
    providing a current limiting device in series with a capacitive stability device, between the power supply and the capacitive stability device, and in parallel with the operative component;
    operating the current limiting device in an initial state where the current limiting device restrains a charging current to the capacitive stability device, and without passing a steady state power supply to the operative component; and
    operating the current limiting device in a steady state to allow the charging current to flow to the capacitive stability device.

13. The method of claim 12, wherein the current limiting device comprises a field effect transistor (FET) operated to present a high internal resistance in the initial state and a low internal resistance in the steady state.

14. The method of claim 13, wherein the FET is biased in the initial state and the steady state via a set of components connected across the operative component and to a gate terminal of the FET.

15. The method of claim 12, wherein, during the steady state operation, a ripple current received by the capacitive stability device has a significantly lower magnitude than a current flowing through the operative component.

16. The method of claim 12, wherein the capacitive stability device comprises a capacitor.

17. The method of claim 12, wherein the capacitive stability device comprises a plurality of capacitors.

18. The method of claim 17, further comprising the current limiting device controlling power supply to the plurality of capacitors in a sequential manner.

19. The method of claim 17, wherein the current limiting device comprises a plurality of FETs in parallel with each other and in series with a respective capacitor of the plurality of capacitors.

* * * * *